US010489687B2

(12) United States Patent
Tsai et al.

(10) Patent No.: US 10,489,687 B2
(45) Date of Patent: Nov. 26, 2019

(54) CLASSIFICATION METHOD, CLASSIFICATION MODULE AND COMPUTER PROGRAM PRODUCT USING THE SAME

(71) Applicant: INDUSTRIAL TECHNOLOGY RESEARCH INSTITUTE, Hsinchu (TW)

(72) Inventors: Dong-Chen Tsai, Miaoli (TW); Tsann-Tay Tang, Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 1 day.

(21) Appl. No.: 15/589,423

(22) Filed: May 8, 2017

(65) Prior Publication Data
US 2018/0144216 A1 May 24, 2018

(30) Foreign Application Priority Data
Nov. 23, 2016 (TW) .............................. 105138415 A

(51) Int. Cl.
*G06K 9/62* (2006.01)
*G06N 3/04* (2006.01)
*G06N 3/08* (2006.01)

(52) U.S. Cl.
CPC ......... *G06K 9/6267* (2013.01); *G06K 9/6256* (2013.01); *G06N 3/04* (2013.01); *G06N 3/08* (2013.01)

(58) Field of Classification Search
CPC .. G06K 9/6267; G06K 9/6256; G06K 9/6274; G06K 9/6269; G06K 9/4628;
(Continued)

(56) References Cited

U.S. PATENT DOCUMENTS 7,127,099 B2 * 10/2006 Noy .................. G01N 21/95607
382/149
7,188,050 B2 * 3/2007 Yuan .................... G05B 23/024
702/183
(Continued)

FOREIGN PATENT DOCUMENTS

CN       102288619 A    12/2011
TW        550391 B      9/2003
(Continued)

OTHER PUBLICATIONS

Jonathan Masci et al.; "Steel Defect Classification with Max-Pooling Convolutional Neural Networks"; WCCI 2012 IEEE World Congress on Computational Intelligence; Jun. 10-15, 2012; pp. 1-6; Brisbane, Australia.
(Continued)

*Primary Examiner* — Xuemei G Chen
(74) *Attorney, Agent, or Firm* — Muncy, Geissler, Olds & Lowe, P.C.

(57) ABSTRACT

A classification method includes the following steps. Firstly, a classification module including a deep neural network (DNN) is provided. Then, to-be-classified sample is obtained. Then, the DNN automatically extracts a feature response of the to-be-classified sample. Then, whether the feature response of the to-be-classified sample falls within a boundary scope of several training samples is determined; wherein the training samples are classified into several categories. Then, if the feature response of the to-be-classified sample falls within the boundary scope, the DNN determines that to-be-classified sample belongs to which one of the categories according to the training samples.

11 Claims, 3 Drawing Sheets

US 10,489,687 B2
Page 2

(58) Field of Classification Search
CPC ........ G06K 2209/19; G06N 3/08; G06N 3/04; G06N 3/0454; G06T 2207/20081; G06T 2207/20084; G06T 7/0004; G01N 2021/8887; G01N 2021/8854; G01N 21/8851
USPC ...... 382/149, 156, 159; 702/81, 183; 706/12
See application file for complete search history.

(56) References Cited

U.S. PATENT DOCUMENTS

| | | | |
|---|---|---|---|
| 8,315,453 B2 | 11/2012 | Shlain et al. | |
| 9,715,723 B2* | 7/2017 | Shlain | G06T 7/0004 |
| 9,730,643 B2* | 8/2017 | Georgescu | A61B 5/7267 |
| 9,892,344 B1* | 2/2018 | Tran | G06K 9/66 |
| 10,267,748 B2* | 4/2019 | Plihal | G01N 21/55 |
| 2006/0215902 A1* | 9/2006 | Shibuya | G01N 21/95607 |
| | | | 382/149 |
| 2008/0260239 A1* | 10/2008 | Han | G06K 9/00248 |
| | | | 382/156 |
| 2009/0228412 A1* | 9/2009 | Matsumoto | G06K 9/00765 |
| | | | 706/12 |
| 2009/0234607 A1* | 9/2009 | Yuan | G05B 19/4065 |
| | | | 702/81 |
| 2012/0027285 A1* | 2/2012 | Shlain | G06K 9/6256 |
| | | | 382/149 |
| 2014/0107977 A1* | 4/2014 | Fujishima | G06F 11/30 |
| | | | 702/183 |
| 2015/0356367 A1* | 12/2015 | Han | G06K 9/34 |
| | | | 382/159 |
| 2016/0034788 A1 | 2/2016 | Lin et al. | |
| 2016/0163035 A1* | 6/2016 | Chang | G06K 9/4628 |
| | | | 382/149 |
| 2016/0328837 A1* | 11/2016 | He | G06T 7/0004 |
| 2017/0147909 A1* | 5/2017 | Izumi | G06K 9/6262 |
| 2017/0177997 A1* | 6/2017 | Karlinsky | G06N 3/08 |
| 2017/0364798 A1* | 12/2017 | Karlinsky | G06N 3/08 |
| 2018/0033066 A1* | 2/2018 | Liu | G06Q 30/0623 |
| 2018/0174000 A1* | 6/2018 | Takagi | G06K 9/6262 |

FOREIGN PATENT DOCUMENTS

| | | |
|---|---|---|
| TW | 200844429 A | 11/2008 |
| TW | 200849141 A | 12/2008 |
| TW | I456190 B | 10/2014 |
| WO | WO 2016/090044 A1 | 6/2016 |

OTHER PUBLICATIONS

Alex Krizhevsky et al.; "ImageNet Classification with Deep Convolutional Neural Networks"; Neural Information Processing Systems (NIPS); 2012; https://www.nvidia.cn/.../imagenet-classification-with-deep-convolutional-nn.pdf.

* cited by examiner

CLASSIFICATION METHOD, CLASSIFICATION MODULE AND COMPUTER PROGRAM PRODUCT USING THE SAME

CROSS-REFERENCE TO RELATED APPLICATION

This application claims the priority benefit of Taiwan application serial No. 105138415, filed on Nov. 23, 2016. The entirety of the above-mentioned patent application is hereby incorporated by reference herein.

TECHNICAL FIELD

The technical field relates to a classification method, a classification module and a computer program product using the same.

BACKGROUND

Conventional classification method for to-be-classified sample generally includes the following steps: an automated optical inspection (AOI) captures an image, and then a feature of the image is analyzed for performing a defect detection or a defect classification. In order to cope with a false alarm rate of the AOI, a defect classification unit using machine learning way is usually added to the AOI for inspecting the image. However, before the defect classification unit performs the defect classification, it is required to perform a large number of manual classifications for obtaining labeled data. Therefore, how to save labor hours of manual classification is one of the efforts of those skilled in the art.

SUMMARY OF THE DISCLOSURE

According to an embodiment of the disclosure, a classification method is provided. The classification method includes the following steps. A classification module including Deep Neural Network (DNN) is provided; a to-be-classified sample is obtained; a feature response of the to-be-classified sample is automatically extracted by the DNN; whether the feature response of the to-be-classified sample is within a boundary scope of a plurality of training samples is determined, wherein the training samples belong to a plurality of categories; if the feature response of the to-be-classified sample is within the boundary scope of the training samples, which one of the categories does the to-be-classified sample belong to is determined.

According to another embodiment of the disclosure, a classification module is provided. The classification module includes a DNN and a determination unit. The DNN is configured to automatically extract a feature response of the to-be-classified sample. The determination unit is configured to determine whether the feature response of the to-be-classified sample is within a boundary scope of a plurality of training samples, wherein the training samples belong to a plurality of categories. If the feature response of the to-be-classified sample is within the boundary scope of the training samples, the DNN determines that the to-be-classified sample belongs to which one of the categories according to the training samples.

According to another embodiment of the disclosure, a non-transitory computer-readable medium storing a program causing a classification module to execute a classification method. The classification method includes the following steps. A classification module including Deep Neural Network (DNN) is provided; a to-be-classified sample is obtained; a feature response of the to-be-classified sample is automatically extracted by the DNN; whether the feature response of the to-be-classified sample is within a boundary scope of a plurality of training samples is determined, wherein the training samples belong to a plurality of categories; if the feature response of the to-be-classified sample is within the boundary scope of the training samples, which one of the categories does the to-be-classified sample belong to is determined.

The above and other aspects of the present disclosure will become better understood with regard to the following detailed description of the preferred but non-limiting embodiment(s). The following description is made with reference to the accompanying drawings.

Figure 1:
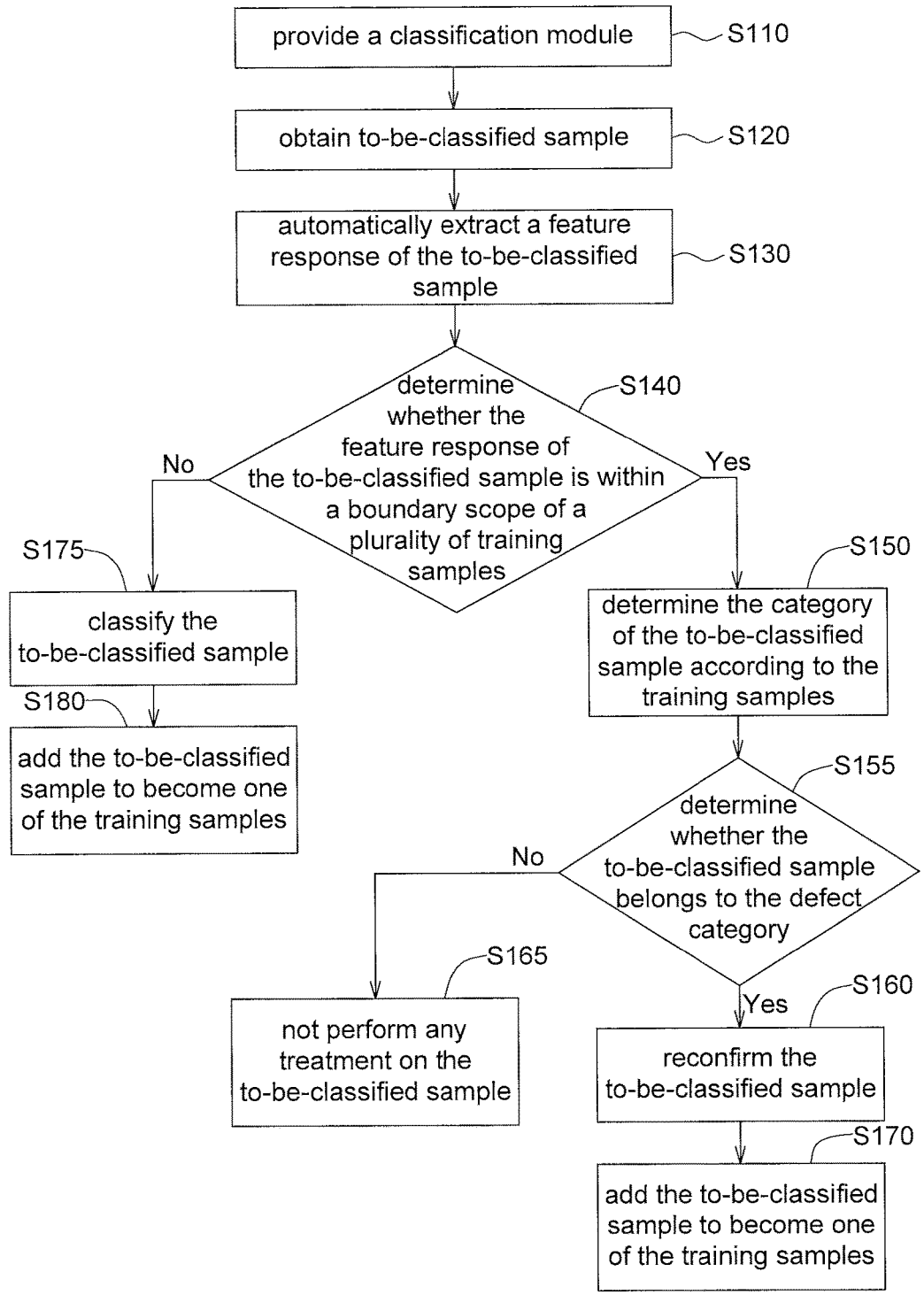
FIG. 1 illustrates a flowchart of a classification method according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF DISCLOSED EMBODIMENTS

Figure 2:
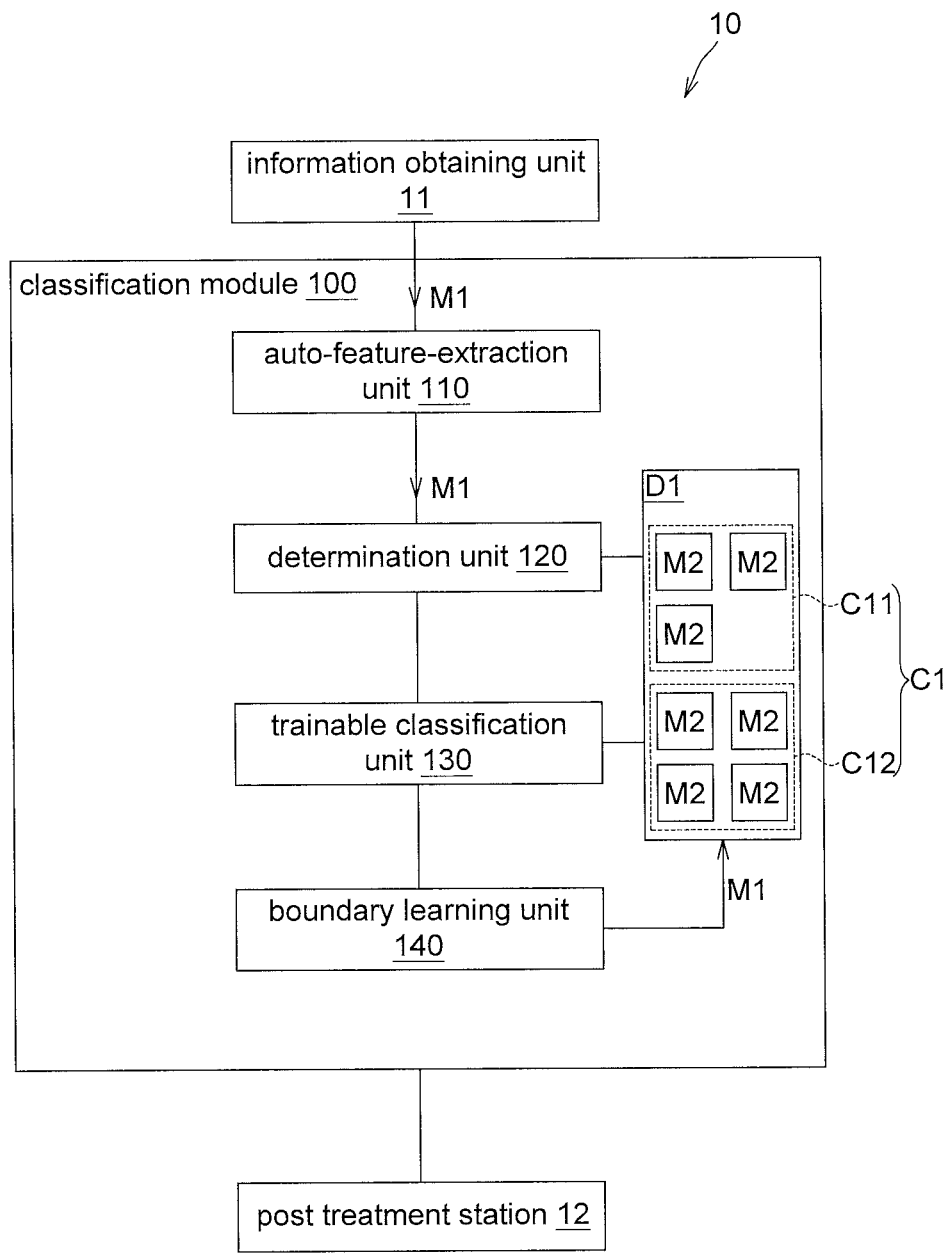
FIG. 2 illustrates a diagram of a classification system according to an embodiment of the present disclosure.

FIG. 1 illustrates a flowchart of a classification method according to an embodiment of the present disclosure, and FIG. 2 illustrates a diagram of a classification system 10 according to an embodiment of the present disclosure.

In step S110, the classification system 10, as illustrated in FIG. 2, is provided. The classification system 10 includes an information obtaining unit 11, a classification module 100 and a post treatment station 12. The classification module 100 includes an auto-feature-extraction unit 110, a determination unit 120, a trainable classification unit 130 and a boundary learning unit 140. The auto-feature-extraction unit 110 and the trainable classification unit 130 may be achieved by a Deep Neural Network (DNN). The DNN may be achieved by various network architectures including, for example, LeNet, AlexNet, VGG-Net, GoogleNet, ResNet and wide residual network. In the present embodiment, AlexNet is taken for example.

In addition, the classification module 100 may be integrated into a processor (not illustrated) or be independent from the processor, wherein the classification module 100 is controlled by the processor. The aforementioned processor is, for example, a center processing unit (CPU) or an operation processing unit. In addition, the classification module 100 may be software or firmware, or in the form of a semiconductor circuit or other circuit.

In step S120, the information obtaining unit 11 obtains a plurality of to-be-classified samples M1. For example, the information obtaining unit 11 is, for example, an Automated Optical Inspection (AOI) which may capture the to-beclassified samples M1 of a product, wherein the product is, for example, a circuit board, a wafer, a display panel, or any other product suitable for being produced on a production line, and any one of the to-be-classified sample M1 is, for example, an image of the product. On the production line, defect detection and/or defect classification is performed on each product by the steps S120-S180.

In step S130, the auto-feature-extraction unit 110 automatically extracts a feature response of each to-be-classified sample M1. The feature response is, for example, the degree of response of a particular feature of the to-be-classified sample M1. The stronger the response of the particular feature of the to-be-classified sample M1 is, the larger the probability of the to-be-classified sample M1 having the particular feature is. In the example of the particular feature being the feature (for example, the component misalignment or solder paste offset) of a defect category, the stronger the response of the particular feature of the to-be-classified sample M1 is, the larger the probability of the to-be-classified sample M1 having the defect feature is. In addition, each to-be-classified sample M1 may have one or more than one particular feature. The classification module 100 determines the category of each to-be-classified sample M1 according to the particular feature of the to-be-classified sample M1.

In step S140, the determination unit 120 determines whether the feature response of the to-be-classified sample M1 is within a boundary scope of a plurality of training samples M2. The training samples M2 may be stored in a database D1, wherein the database D1 may be stored in the determination unit 120, another component of the classification module 100 or another memory. The categories C1 of the present embodiment include, for example, a non-defect category C11 and a defect category C12. All training samples M2 belong to a plurality of the categories C1. For example, one or some of the training samples M2 belong to the non-defect category C11, and the others of the training samples M2 belong to the defect category C12. In another embodiment, the number of the categories C1 may be more than two, that is, the categories C1 are not limited to the non-defect category C11 and the defect category C12. The categories C1 may depend on the properties of the to-be-classified samples M1, and such exemplification is not meant to be for limiting. In addition, each training sample M2 may have one or more than one particular feature as described above.

In addition, due to the number of the training samples M2 belonging to the defect category C12 being enough, the classification accuracy of the defect category C12 may be increased. In an embodiment, the number of the training samples M2 belonging to the defect category C12 is equal to the number of the training samples M2 belonging to the non-defect category C11. For example, the number of the training samples M2 belonging to the defect category C12 and the number of the training samples M2 belonging to the non-defect category C11 each is 500.

If the feature response of the to-be-classified sample M1 is within the boundary scope, it represents the to-be-classified sample M1 belongs to one of the categories C1, for example, one of the non-defect category C11 and the defect category C12, and thus process proceeds to step S150. If the feature response of the to-be-classified sample M1 is outside the boundary scope, it represents the to-be-classified sample M1 does not belong to one of the categories C1. Therefore, the category of the to-be-classified sample M1 can't be determined, and thus the process proceeds to step S175.

In step S150, if the feature response of the to-be-classified sample M1 is within the boundary scope, the trainable classification unit 130 may determine the category C1 of the to-be-classified sample M1 according to the training samples M2 in the database D1. For example, the to-be-classified sample M1 is determined to belong to the non-defect category C11 or the defect category C12.

In step S155, the trainable classification unit 130 determines whether the to-be-classified sample M1 belongs to a reconfirmation category of the categories C1, for example, the defect category C12. If the to-be-classified sample M1 belongs to the reconfirmation category, the process proceeds to step S160 to manually reconfirm the to-be-classified sample M1 at the post treatment station 12. If the to-be-classified sample M1 does not belong to the reconfirmation category, the process proceeds to step S165. In step S165, due to the to-be-classified sample M1 not belonging to the reconfirmation category, the classification module 100 or worker may not perform any treatment on the to-be-classified sample M1 under the trust in the determination result by the classification module 100. As a result, the labor hours for the to-be-classified sample M1 may be saved.

In step S160, at the post treatment station 12, whether the to-be-classified sample M1 belongs to the defect category is reconfirmed manually. After re-confirmation, the classification module 100 labels the to-be-classified sample M1 regardless of whether the to-be-classified sample M1 belongs to the defect category. The item "label" means that the classification module 100 defines the to-be-classified sample M1 according to manual input. For example, the category of the to-be-classified sample M1 is set according to the manual input. Then, since the to-be-classified sample M1 is labeled, whether or not the to-be-classified sample M1 belongs to the defect category, the process proceeds to step S170.

In step S170, the boundary learning unit 140 adds the to-be-classified sample M1 to become one of training samples M2. As a result, it may increase the number of the training samples M2, and accordingly the probability of manual classification for next to-be-classified sample M1 may be reduced, and labor hours of the manual classification may be saved. Then, the process proceeds to step S120 to classify the next to-be-classified sample M1.

In addition, the boundary learning unit 140 may determine new boundary scope of all training samples M2. Alternatively, the boundary learning unit 140 may determine new boundary scope of all training materials M2 after several new training samples M2 are accumulated. Subsequently, whether the feature responses of the to-be-classified samples M1 are within the boundary scope of a plurality of training samples is determined according to the new boundary scope. In an embodiment, the boundary learning unit 140 may be achieved by one-class SVM (Support Vector Machine). The one-class SVM (OC-SVM) may be achieved by using various algorithm including PCA-related techniques, auto-encoder, probability parametric (such as Gaussian model) and non-parametric (such as Parzen window method) related techniques, one-class SVM, support vector domain description (SVDD) and a Nearest Neighbor methods. In the present embodiment, the OC-SVMs are taken for example.

The process proceeds back step S140, if the feature response of the to-be-classified sample M1 is outside the boundary scope, it represents the to-be-classified sample M1 does not belong to anyone of the training samples M2. Therefore, the category of the to-be-classified sample M1 can't be determined, and thus process proceeds to step S175.

In step S175, the to-be-classified sample M1 is classified manually. For example, the category of the to-be-classified sample M1, such as the non-defect category C11 or the defect category C12 is determined manually. Then, the classification module 100 labels the to-be-classified sample M1 for setting the to-be-classified sample M1 as the category, such as the non-defect category C11 or the defect category C12.

In step S180, the boundary learning unit 140 adds the to-be-classified sample M1 to become one of the training samples M2. As a result, it may increase the number of the training samples M2, and accordingly the probability of manual classification for next to-be-classified sample M1 may be reduced, and labor hours of the manual classification may be saved. Then, the process proceeds to step S120 to continuous to classify the next to-be-classified sample M1.

Similarly, the boundary learning unit 140 may determine new boundary scope of all training samples M2. Alternatively, the boundary learning unit 140 may determine new boundary scope of all training samples M2 after the several new training samples M2 are accumulated. Subsequently, whether the feature responses of the to-be-classified samples M1 are within the boundary scope of a plurality of training samples is determined according to the new boundary scope.

Figure 3:
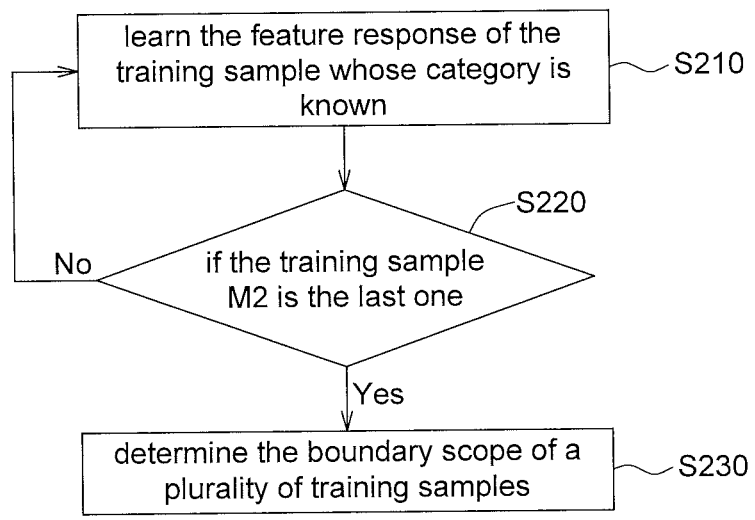
FIG. 3 illustrates a flowchart of a learning process of the DNN learning a plurality of the training samples according to an embodiment of the present disclosure.

FIG. 3 illustrates a flowchart of a learning process of the DNN learning a plurality of the training samples M2 according to an embodiment of the present disclosure.

In step S210, the DNN (includes auto-feature-extraction unit 110 and the trainable classification unit 130) learns the feature response of the training sample M2 whose category is known. The training samples M2 whose categories are known are obtained by, for example, the information obtaining unit 11, then classified by manual way and then learned by the DNN. After repeating step S210, a plurality of the feature responses of the training samples M2 may be obtained. Then, in step S220, if the training sample M2 is the last one, process proceeds to step S230. If the training sample M2 is not the last one, process proceeds back step S210, the DNN continuous to learn the feature response of the next training sample M2. In step S230, the boundary learning unit 140 may determine the boundary scope of a plurality of training samples M2 by using the one-class SVM or other technique.

As shown in Table 1 below, the first batch of samples is the training samples M2, and the second batch of samples to the fourth batch of samples are the to-be-classified samples M1, wherein the number of the second batch of samples, the number of the third batch of samples and the number of the fourth batch of samples each is 1000. As shown in Table 1 below, after using the classification method of the present disclosure, Only 769 of the second batch of samples need to be manually classified, only 721 of the third batch of samples need to be manually classified, whereas only 703 of the fourth batch of samples need to be manually classified. For all to-be-classified samples M1 (the number of the to-be-classified samples M1 is 3000), the manual classification rate may be reduced by about 26.9%, that is, saving of 26.9% in manual labor hours.

Furthermore, the determination unit 120 and the boundary learning unit 140 are designed to be independent or different from the DNN. In detail, the DNN itself does not possess the functions of the determination unit 120 and the boundary learning unit 140, and thus it is necessary for mere DNN (that is, without the determination unit 120 and the boundary learning unit 140) to classify all to-be-classified samples M1. Since the classification method of the present embodiment includes the determination unit 120 and the boundary learning unit 140, the labor hours for the to-be-classified samples M1 may be saved, and accordingly the classification effectiveness may be improved.

TABLE 1

| | the number of the to-be-classified samples | the number of manually classifying samples | saving in manual labor hours (%) |
|---|---|---|---|
| first batch | 1000 | 1000 | 0 |
| second batch | 1000 | 769 | 23.1 |
| third batch | 1000 | 721 | 27.9 |
| fourth batch | 1000 | 703 | 29.7 |
| first batch + second batch + third batch | 3000 | 2193 | 26.9 |

As shown in Table 2 below, the first batch of samples is the training samples M2 which are learned by the DNN using the process of FIG. 3. The second batch of samples to the fourth batch of samples are the to-be-classified samples M1, wherein the number of the second batch of samples, the number of the third batch of samples and the number of the fourth batch of samples each is 1000. As shown in Table 2 below, in the classification for the first batch of samples and the second batch of samples by using mere the DNN, the precision rate, the recall rate and F-measure are 94.99%、91% and 92.95% respectively. However, in the classification for the first batch of samples and the second batch of samples by using the classification method of the present disclosure further including the determination unit 120 and the boundary learning unit 140, the precision rate, the recall rate and F-measure are 95.19%, 91% and 93.05% respectively. There is small difference between two results. In other words, the embodiment of the present disclosure provides a classification level of the precision rate, the recall rate and F-measure close to the DNN. The sum of the first batch of samples, the second batch of samples and the third batch of samples has the similar technical effect, and the sum of the first batch of samples, the second batch of samples, the third batch of samples and the fourth batch of samples also has the similar technical effect, and the similarities are not repeated.

TABLE 2

| | technique | the number of manually classifying samples | Precision rate (%) | Recall rate (%) | F-measure |
|---|---|---|---|---|---|
| first batch of samples | DNN | 1000 | 95.95 | 90 | 92.88 |
| first batch of samples + second batch of samples | DNN SVM + DNN | 2000 1769 | 94.99 95.19 | 91 91 | 92.95 93.05 |
| first batch of samples + second batch of samples + third batch of samples | DNN SVM + DNN | 3000 2490 | 96 96.19 | 91.2 91 | 93.54 93.53 |
| first batch of samples + second batch of samples + third batch of samples + fourth batch of samples | DNN SVM + DNN | 4000 3193 | 96.43 96.41 | 91.8 91.2 | 94.06 93.73 |

It will be apparent to those skilled in the art that various modifications and variations can be made to the structure of the disclosed embodiments without departing from the scope or spirit of the disclosure. In view of the foregoing, it is intended that the disclosure cover modifications and variations of the present disclosure provided they fall within the scope of the following claims and their equivalents.

What is claimed is:

1. A classification method, comprising:
providing a classification module comprising a Deep Neural Network (DNN);
obtaining a to-be-classified sample of a product, wherein the to-be-classified sample is an image captured by an Automated Optical Inspection (AOI);
automatically extracting a feature response of the to-be-classified sample by the Deep Neural Network;
determining whether the feature response of the to-be-classified sample is within a boundary scope of a plurality of training samples, wherein the training samples belong to a plurality of categories; and
if the feature response of the to-be-classified sample is within the boundary scope of the training samples, determining that the to-be-classified sample belongs to which one of the categories;
wherein the categories comprise a defect category and a non-defect category; the step of determining that the to-be-classified sample belongs to which one of the categories comprises:
determining whether the to-be-classified sample belongs to the defect category; and
wherein the classification method further comprises:
if the to-be-classified sample belongs to the defect category, reconfirming whether the to-be-classified sample belongs to the defect category or the non-defect category; and
if the to-be-classified sample belongs to the defect category after being reconfirmed, adding the to-be-classified sample to become one of the training samples.

2. The classification method according to claim 1, further comprising:
if the feature response of the to-be-classified sample is not within the boundary scope of the training samples, classifying the to-be-classified sample.

3. The classification method according to claim 1, further comprising:
if the feature response of the to-be-classified sample is outside the boundary scope of the training samples, manually classifying the to-be-classified sample.

4. The classification method according to claim 2, wherein after the step of classifying the to-be-classified sample, the classification method further comprising:
adding the to-be-classified sample to become one of the training samples.

5. The classification method according to claim 1, further comprising:
if the to-be-classified sample does not belong to the defect category after being reconfirmed, adding the to-be-classified sample to become one of the training samples.

6. The classification method according to claim 1, wherein the training samples belong to the defect category and the non-defect category, the number of the training samples belonging to the defect category and the number of the training samples belonging to the non-defect category are equal.

7. The classification method according to claim 1, wherein before the step of determining whether the feature response of the to-be-classified sample is within the boundary scope of the training samples, the classification method further comprises a learning process comprising:
obtaining a plurality of the training samples;
learning the feature response of each training sample by the Deep Neural Network;
determining the boundary scope of the training samples.

8. A classification module, comprising:
a Deep Neural Network configured to automatically extract a feature response of a to-be-classified classified sample of a product, wherein the to-be-classified sample is an image captured by an Automated Optical Inspection; and
a determination unit configured to determine whether the feature response of the to-be-classified sample is within a boundary scope of a plurality of training samples, wherein the training samples belong to a plurality of categories;
wherein if the feature response of the to-be-classified sample is within the boundary scope of the training samples, the Deep Neural Network determines that the to-be-classified sample belongs to which one of the categories;
wherein the categories comprise a defect category and a non-defect category; the Deep Neural Network is further configured to determine whether the to-be-classified sample belongs to the defect category; and
wherein the classification module further comprises:
a boundary learning unit configured to: if the to-be-classified sample belongs to the defect category after reconfirming whether the to-be-classified sample belongs to the defect category or the non-defect category, add the to-be-classified sample to become one of the training samples.

9. The classification module according to claim 8, wherein the training samples belong to the defect category and the non-defect category, the number of the training samples belonging to the defect category and the number of the training samples belonging to the non-defect category are equal.

10. The classification module according to claim 8, wherein the Deep Neural Network is further configured to learn the feature response of each training sample; the boundary learning unit is configured to determine the boundary scope of the training samples.

11. A non-transitory computer readable medium storing a program causing a classification module to execute a classification method, the classification method comprising:
automatically extracting a feature response of a to-be-classified sample of a product, wherein the to-be-classified sample is an image captured by an Automated Optical Inspection;
determining whether the feature response of the to-be-classified sample is within a boundary scope of a plurality of training samples, wherein the training samples belong to a plurality of categories; and
if the feature response of the to-be-classified sample is within the boundary scope of the training samples, determining that the to-be-classified sample belongs to which one of the categories;
wherein the categories comprise a defect category and a non-defect category; the step of determining that the to-be-classified sample belongs to which one of the categories comprises:
determining whether the to-be-classified sample belongs to the defect category; and wherein the classification method further comprises:
  if the to-be-classified sample belongs to the defect category, reconfirming whether the to-be-classified sample belongs to the defect category or the non-defect category; and
  if the to-be-classified sample belongs to the defect category after being reconfirmed, adding the to-be-classified sample to become one of the training samples.

\* \* \* \* \*